United States Patent [19]

McCleerey et al.

[11] Patent Number: 5,470,255
[45] Date of Patent: Nov. 28, 1995

[54] EXTENDED HEIGHT CONNECTOR FOR A BATTERY

[75] Inventors: Earl W. McCleerey, Mechanicsburg; Hurley C. Moll, Jr., Harrisburg; John M. Landis, Camp Hill; George H. Douty, Mifflintown, all of Pa.

[73] Assignee: The Whitaker Corporation, Wilmington, Del.

[21] Appl. No.: 105,987

[22] Filed: Aug. 10, 1993

Related U.S. Application Data

[63] Continuation-in-part of Ser. No. 35,817, Mar. 23, 1993, abandoned.

[51] Int. Cl.$^6$ ..................................... H01R 3/00
[52] U.S. Cl. ............................. 439/500; 439/928
[58] Field of Search .................. 320/2; 439/500, 439/856, 861, 862, 660, 928, 676; 429/97–100

[56] References Cited

U.S. PATENT DOCUMENTS

| | | | |
|---|---|---|---|
| 3,268,849 | 7/1963 | Silverberg | 339/182 |
| 3,348,116 | 10/1967 | Freeman et al. | 320/2 |
| 3,728,664 | 4/1973 | Hurst | 339/91 R |
| 4,101,818 | 7/1978 | Kelly, III et al. | 320/2 |
| 4,141,616 | 2/1979 | Gottlieb | 339/75 M |
| 4,214,197 | 7/1980 | Mann et al. | 320/2 |
| 4,303,876 | 12/1981 | Kelly, III et al. | 320/2 |
| 4,578,628 | 3/1986 | Siwiak | 320/2 |
| 4,629,962 | 12/1986 | Arakawa | 320/2 |
| 4,636,703 | 1/1987 | Tohya et al. | 320/2 |
| 4,670,701 | 6/1987 | Sako et al. | 320/2 |
| 4,680,527 | 7/1987 | Benenati et al. | 320/2 |
| 4,816,735 | 3/1989 | Cook et al. | 320/2 |
| 4,873,479 | 10/1989 | Iimura et al. | 320/2 |
| 4,907,987 | 3/1990 | Douty et al. | 439/571 |
| 4,963,812 | 10/1990 | Mischenko et al. | 320/2 |
| 5,004,434 | 4/1991 | Aiello et al. | 439/636 |
| 5,007,859 | 4/1991 | Sangregory et al. | 439/500 |
| 5,028,859 | 7/1991 | Johnson et al. | 320/15 |
| 5,035,024 | 7/1991 | Steiner et al. | 439/928 |
| 5,039,929 | 8/1991 | Veistroffer et al. | 320/2 |
| 5,052,943 | 10/1991 | Davis | 439/357 |
| 5,059,885 | 10/1991 | Weiss et al. | 320/2 |
| 5,065,082 | 11/1991 | Fushiya | 320/2 |
| 5,122,721 | 6/1992 | Okada et al. | 320/2 |
| 5,148,094 | 9/1992 | Parks et al. | 320/2 |
| 5,157,318 | 10/1992 | Wang | 320/2 |
| 5,158,468 | 10/1992 | Curtis et al. | 439/76 |
| 5,162,719 | 11/1992 | Tomura et al. | 320/2 |
| 5,187,422 | 2/1993 | Izenbaard et al. | 320/2 |
| 5,220,270 | 6/1993 | Peickert | 320/2 |
| 5,225,760 | 7/1993 | Leiserson et al. | 320/2 |
| 5,245,266 | 9/1993 | Yuen | 320/2 |
| 5,256,955 | 10/1993 | Tomura et al. | 320/2 |

FOREIGN PATENT DOCUMENTS

| | | |
|---|---|---|
| 0142952A2 | 10/1984 | European Pat. Off. . |
| 0291391A1 | 5/1988 | European Pat. Off. . |
| 0535975A1 | 7/1993 | European Pat. Off. ........ H01R 13/24 |
| 0244609 | 12/1925 | United Kingdom . |
| 2192496A | 1/1988 | United Kingdom . |

*Primary Examiner*—David L. Pirlot

[57] ABSTRACT

An electrical connector (1) for a battery (2) comprises, an insulating package (3) containing battery cells (4) and extended height, battery terminals (5, 6, 7, 8) accessible through an end (19) of the package (3) and also through a side (20) of the package (3), and the package (3) is adapted for mating upside down with another, mating electrical connector (24).

14 Claims, 7 Drawing Sheets

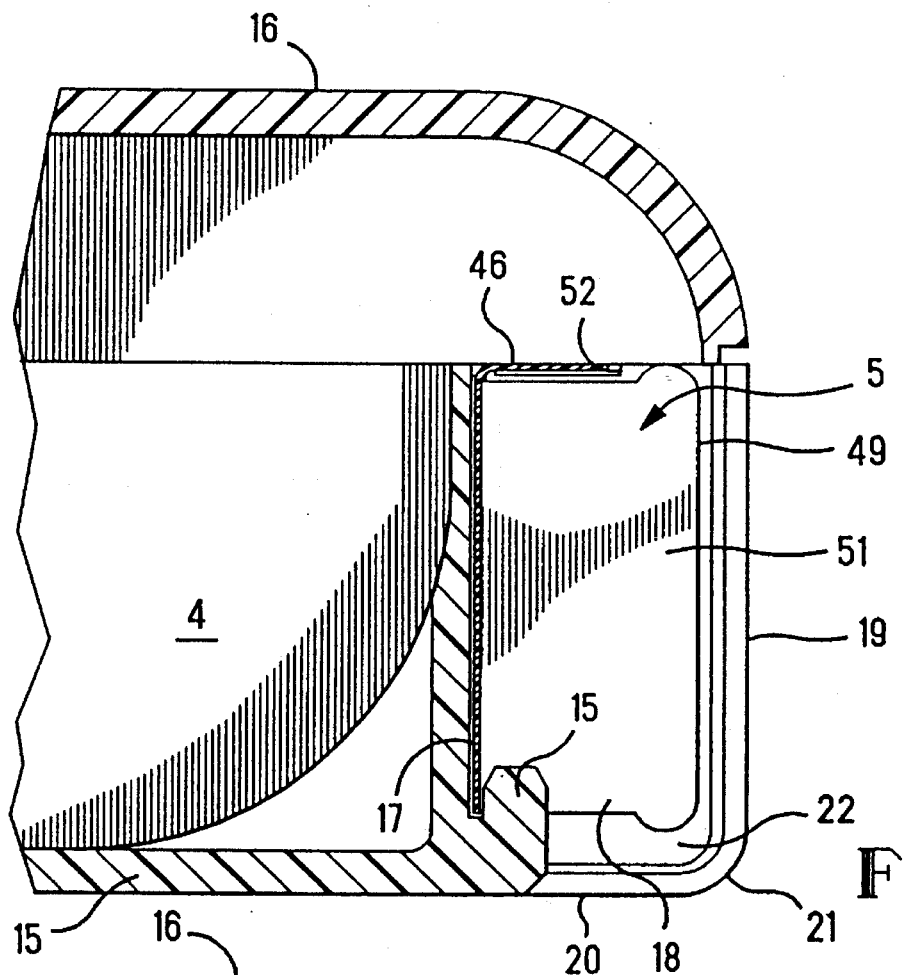
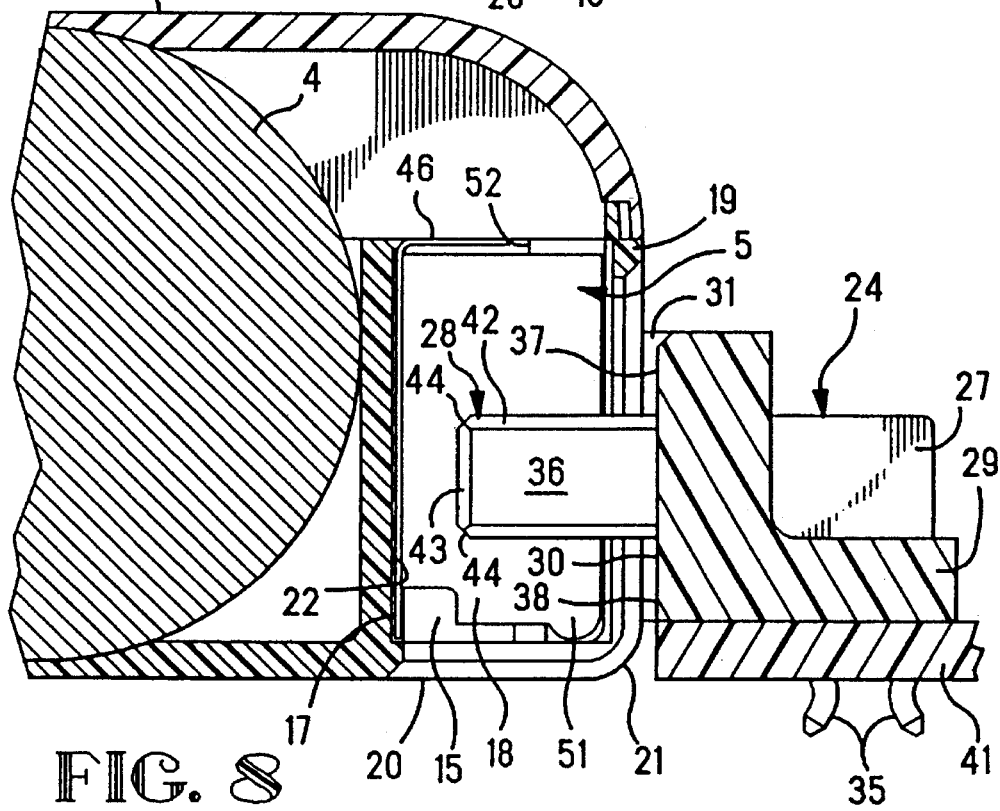

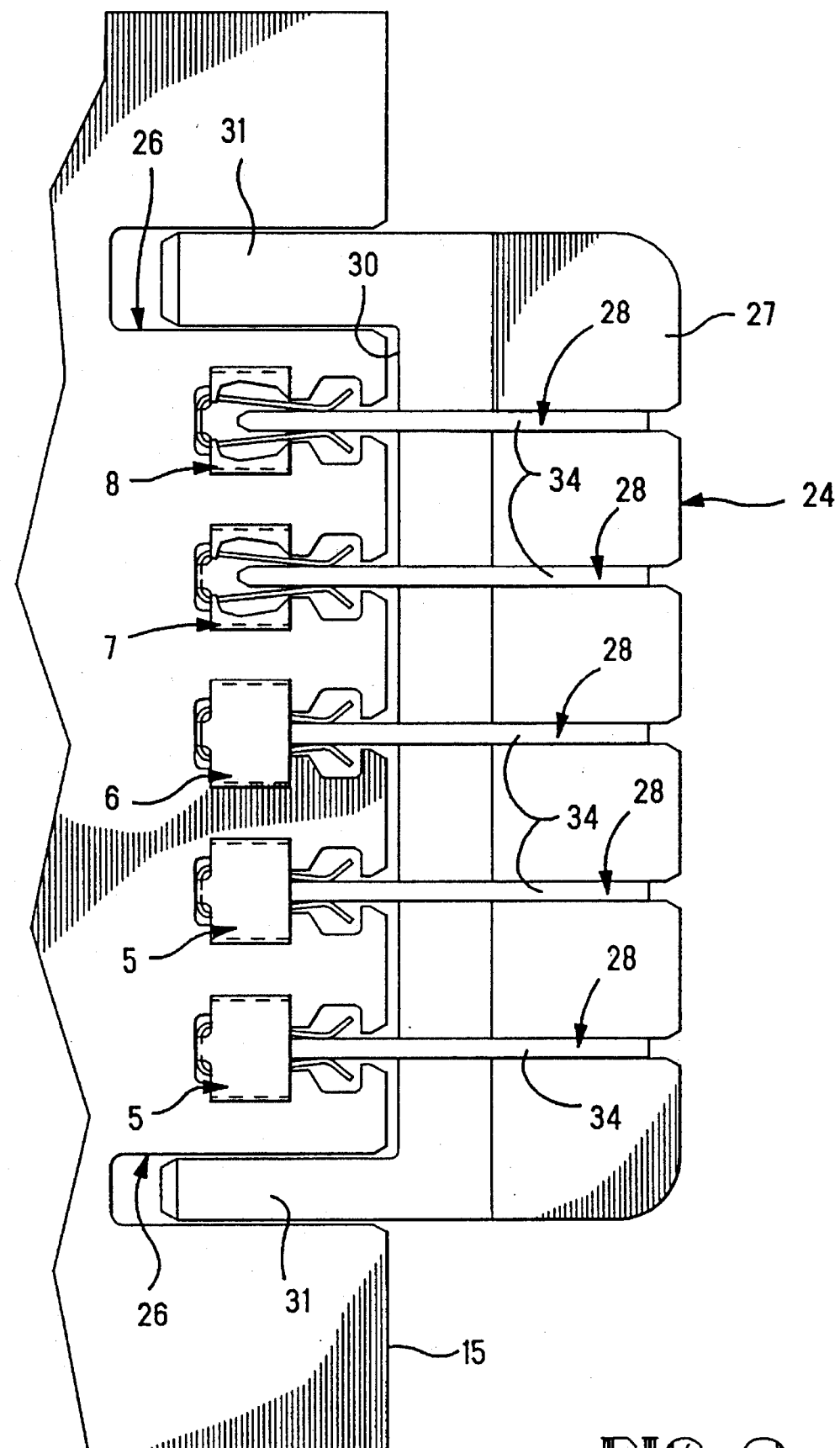

5,470,255

EXTENDED HEIGHT CONNECTOR FOR A BATTERY

CROSS REFERENCE TO RELATED APPLICATION

This application is a continuation-in-part of application, Ser. No. 08/035,817, filed Mar. 23, 1993, now abandoned.

FIELD OF THE INVENTION

The invention pertains to an electrical connector for a battery, and more particularly, to an electrical connector for connection of a rechargeable battery to a circuit board of electronic equipment that relies on the battery for a supply of electrical voltage.

BACKGROUND OF THE INVENTION

Batteries are used to power portable electronic equipment for consumer and business use, such as, video cameras, cellular telephones and computers. Reducing the weight of a battery would desirably lighten the equipment. For example, a battery presently comprises thirty per cent of the weight of a portable computer. To reduce the weight and the size of the battery would result in more frequent battery replacement, or more frequent recharging of a spent battery.

A new generation of smaller, lighter batteries is being developed, batteries having charging circuits inside the batteries themselves. The charging circuits are electronically controlled to charge quickly, and to shut off when full charge is approached. Such a connector for a battery would include battery cells, electrical interconnections for the cells, battery terminals and a package containing the terminals. Such a connector for a rechargeable battery would provide electrical connections for discharging the battery, and separate electrical connections for a charging circuit that is inside the battery. The connector for the battery would connect and disconnect from a header type connector mounted on a circuit board, with the battery terminals being connected with electrical terminals on the header. It would be desirable to provide a connector for a battery that would be adapted to connect the battery terminals to electrical terminals on the header, even when the connector is mounted at different heights relative to the height of a header. Another desirable feature of a connector for a battery would connect the battery upside down, as well as top side up, with a header.

SUMMARY OF THE INVENTION

In one embodiment of a connector for a battery that comprises, a package containing battery cells, electrical interconnections for the cells and battery terminals adapted to connect with terminals of another, mating electrical connector, a feature of the connector resides in battery terminals that permit a range of mating along the height of the terminals. Such a feature is adapted to connect the battery terminals with electrical terminals on a header, even when the connector is mounted at different heights relative to the height of the header.

In another embodiment of a connector for a battery that comprises, a package containing battery cells, electrical interconnections for the cells and battery terminals, a feature of the connector is adapted to connect the battery terminals with terminals of another, mating electrical connector with the package oriented top side up, or, alternatively, upside down.

In another embodiment of a connector for a battery that comprises, a package containing battery cells, electrical interconnections for the cells and battery terminals, a feature of the connector is adapted to provide a keying combination by locating the battery terminals offset to one side of a central axis of the connector. Such a feature of the connector will resist a connection of the battery terminals with terminals of another, mating electrical connector, when the package is incorrectly upside down, or when the mating electrical connector is constructed for mating connection with a different, incompatible keying combination.

Each embodiment of the invention is adapted individually independent of one another to reside in a connector that includes battery terminals and a package containing the terminals and further containing battery cells, electrical interconnections for the cells and a charging control circuit.

An electrical connector for a battery according to the invention comprises, multiple electrical battery terminals connected in electrical series with multiple cells of a battery, a package containing the terminals and the cells, contact surfaces of the terminals being accessible through openings in an end of the package, the contact surfaces having heights extending along the end and providing multiple points of connection along the heights for electrical connection with electrical terminals of another, mating electrical connector, and the openings having heights extending along the end and providing multiple locations along said heights for receiving therein electrical terminals of another, mating electrical connector.

DESCRIPTION OF THE DRAWINGS

Embodiments of the invention will now be described by way of example with reference to the drawings, according to which:

FIG. 7 is a fragmentary elevation view in section of the battery as shown in FIG. 5;

FIG. 8 is a view similar to FIG. 7 of a variation of the battery as shown in FIG. 5, and further depicting mating connection of the battery and another mating connector;

FIG. 9 is a fragmentary elevation view in section of the battery shown in FIG. 5 in mating connection with another mating connector.

DETAILED DESCRIPTION

Figure 1:
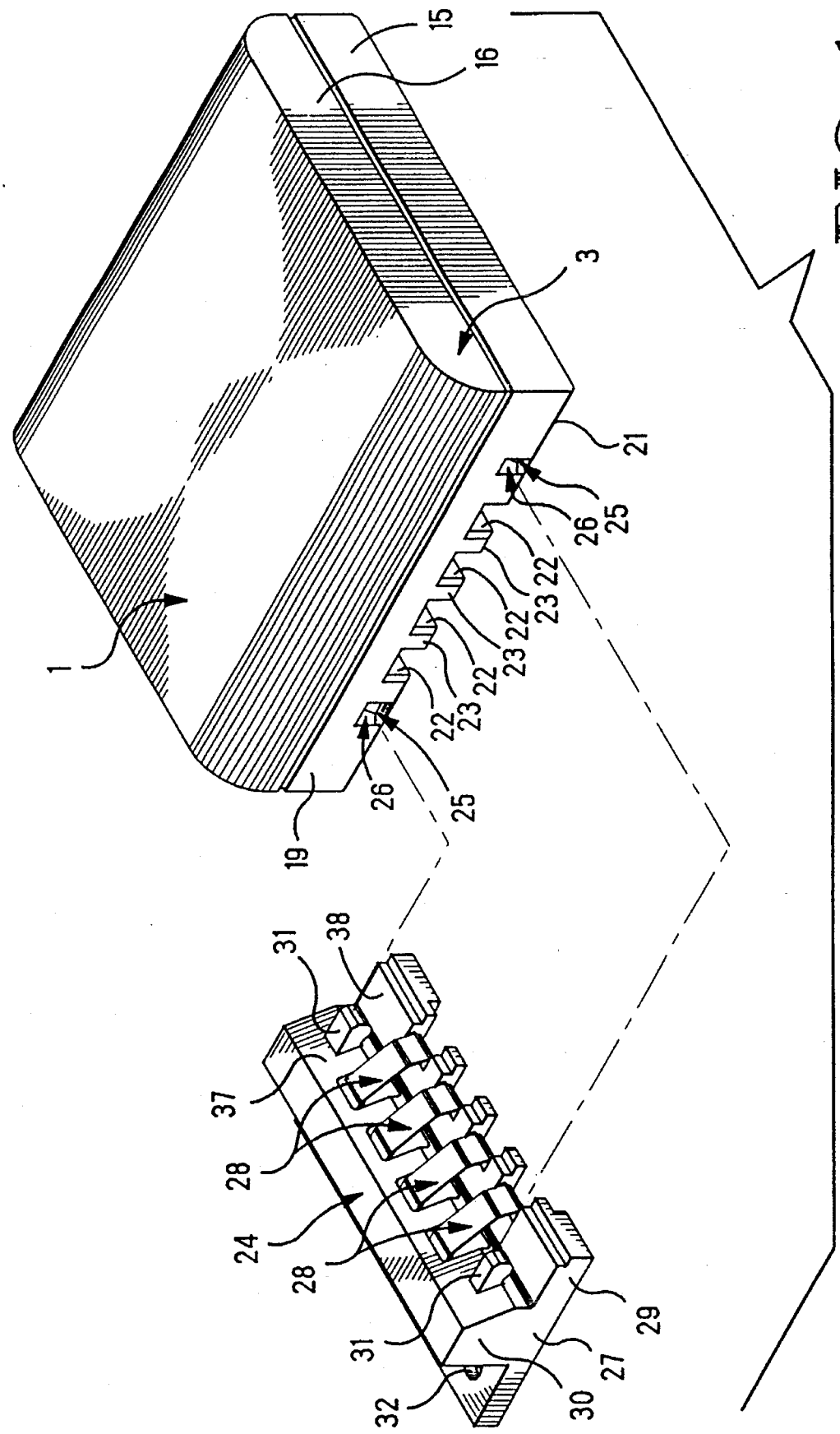
FIG. 1 is a perspective view of a connector for a rechargeable battery together with another, mating connector.
Figure 2:
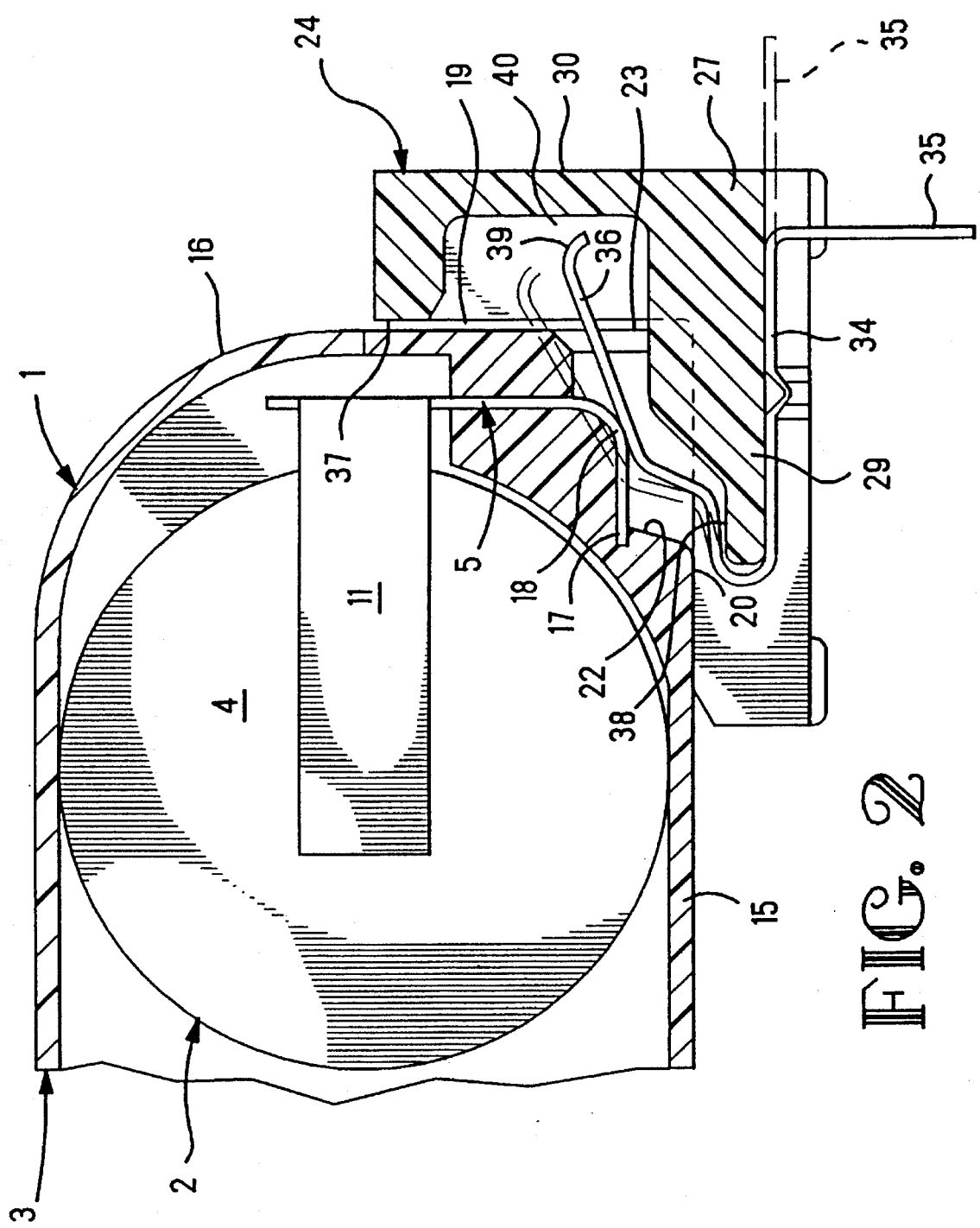
FIG. 2 is a fragmentary view in section of the battery connector in mating connection with the other mating connector.
Figure 3:
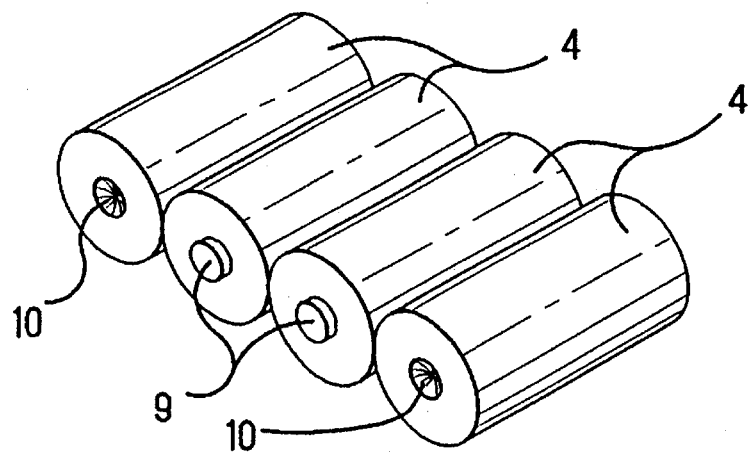
FIG. 3 is a perspective view of multiple battery cells.
Figure 4:
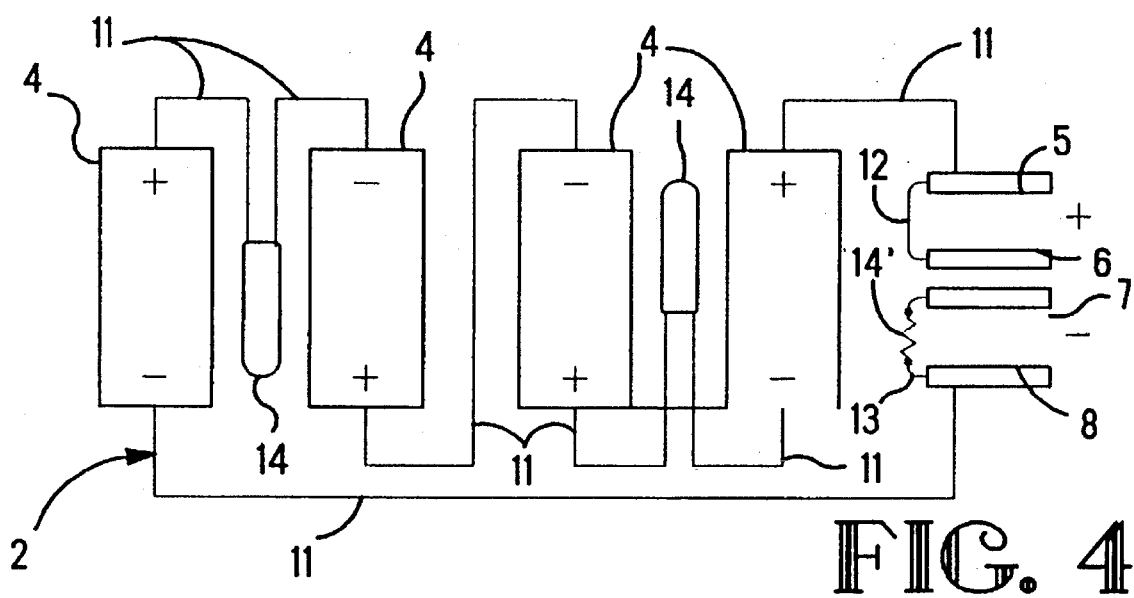
FIG. 4 is a schematic view depicting interconnection of the battery cells with electrical terminals of the connector.

With reference to FIGS. 1, 3, 5, 6 and 10, an electrical connector 1 for a battery 2, FIGS. 2 and 4, comprises, an insulating package 3 containing multiple cells 4 of the battery 2, and a row of four battery terminals 5, 6, 7, and 8. In the connector shown in FIG. 9, an additional contact 5 is combined with the four terminals 5, 6, 7, and 8. A first set comprises the positive polarity terminal 5, and the negative polarity terminal 8, of the battery 2. The terminals 5 and 8 are at opposite ends of the row of terminals 5, 6, 7 and 8. A second set comprises a data terminal 6 and a charging terminal 7, respectively. The data terminal 6 is for connection of electronic data to an electronic charging control circuit, not shown. The charging terminal 7 is for connection of a thermistor controlled, charging transformer, not shown.

With reference to FIGS. 1 and 2, a group of the cells 4 are positioned for being contained in the package 3. The cells 4 each are of known, dry cell, construction. The cells 4 are capable of being recharged by a thermistor controlled, charging transformer, not shown. Each cell 4 provides 1.5 Volts, and includes a positive polarity, cell terminal 9, at one end, and a negative polarity, cell terminal 10 at another end.

With reference to FIGS. 1 and 3, the interconnections of the cells 4 and the terminals 5, 6, 7 and 8, inside the package, will be described. The group of cells 4 are connected electrically in series, as depicted in FIG. 3. Metal strips, 11 represented schematically in FIG. 3, comprise interconnections of the cells 4 electrically in series. The strips 11 are joined, for example, by soldering or welding, to connect to the respective cells 4. The metal strips 11 further are similarly joined to the two terminals 5, 8, at positive and negative polarities, respectively, to connect the terminals 5, 8 to the cells for discharging the battery.

As shown in FIG. 3, another metal strip 12 interconnects the data terminal 6 to the positive polarity terminal 5. Another metal strip 13 interconnects the charging terminal 7 to the negative polarity terminal 8. The metal strips 11 further join and interconnect one or more thermistors 14 in electrical series with the cells 4. Each thermistor 14 comprises part of an electronically controlled charging circuit for recharging the cells 4. Additional electronics, not shown, will be contained in the spaces between the cells 4, inside the package 3.

With reference to FIGS. 1, 5, 7, 8 and 10, the package 3 is of two piece construction, having a base 15 and a cover 16, fabricated by molding a suitable plastics material. The base 15 and the cover 16 are fused or adhesively joined together. The battery terminals 5, 6, 7, 8 are fabricated from metal strip. Each of the terminals 5, 6, 7, 8 extends from inside the package 3, through the base 15, and toward an exterior of the package 3. In the package 3 as shown in FIG. 2, an end 17 of each of the terminals 5, 6, 7, 8 is imbedded in the base 15 of the package 3. The terminals 5, 6, 7, 8 are imbedded in the base 15 of the package 3 by injection molding. With respect to the package shown in FIGS. 7 and 8, an end 17 of each of the terminals 5, 6, 7 and 8 is imbedded in a pocket of the base 15.

With reference to FIGS. 2, 6, 7 and 8, an accessible portion 18 of each of the battery terminals 5, 6, 7, 8 faces toward an end 19 of the package 3, and is oriented to face toward a bottom side 20 of the package 3, as well. Each accessible portion 18 is accessible through the end 19 of the package 3 and also through the side 20 of the package 3. The end 19 and the side 20 of the package 3 intersect along the base 15 at an intersection 21, FIGS. 1, 5, 8 and 10. At the intersection 21 of the end 19 and the side 20, the end 19 and the side 20 of the package 3 are recessed for access to the accessible portions 18 of the battery terminals 5, 6, 7, 8. More specifically, a series of recesses 22 are in the intersection 21. The accessible portions 18 of the battery terminals 5, 6, 7, 8 are within respective recesses 22, and are recessed from the exterior surface of the package 3. The intersection 21 form ribs 23, FIG. 1, between the battery terminals 5, 6, 7, 8, separating the accessible portions 18 of the battery terminals 5, 6, 7, 8, one from another. The accessible portions 18 of the battery terminals 5, 6, 7, 8 are recessed from exterior surfaces of the ribs 23. Accordingly, the end 19 and the side 20 of the package protect the battery terminals 5, 6, 7, 8 from being touched accidentally, while the battery 4 is being carried about.

The end 19 and the side 20 of the package 3 are both adapted to matingly engage another, mating electrical connector 24, FIGS. 1, 8 and 9. Further details of the connectors 1 and 24 of FIG. 1 are disclosed in U.S. Ser. No. 08/035,817, filed Mar. 23, 1993.

A recessed coupling 25, FIG. 1 is divided into two portions at opposite ends of the row of battery terminals 5, 6, 7, 8. The two portions of the coupling 25 are inside respective recesses 26 in the end 19 of the package 3. The recesses 26 are of different widths and are spaced apart a known distance, to distinguish the package 3 from another, incompatible packages 3 having a different spacing or sizes for the recesses 26.

Figure 5:
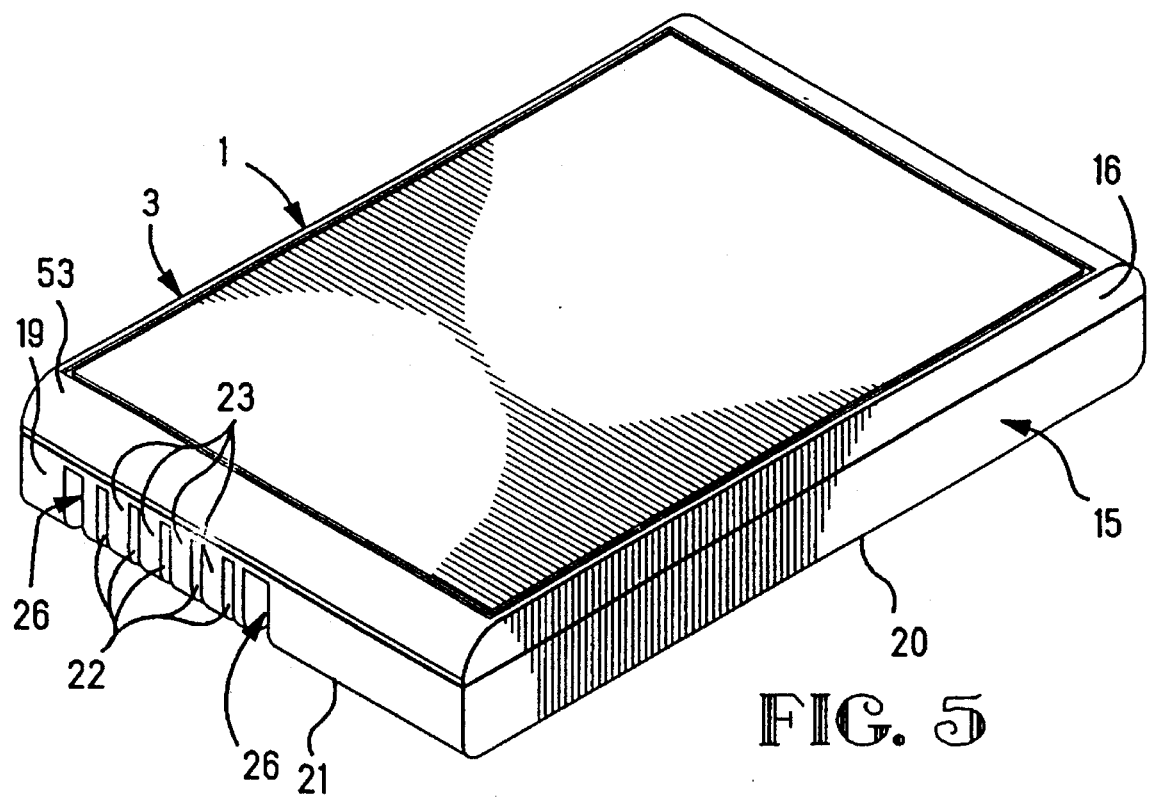
FIG. 5 is a perspective view of another battery.
Figure 10:
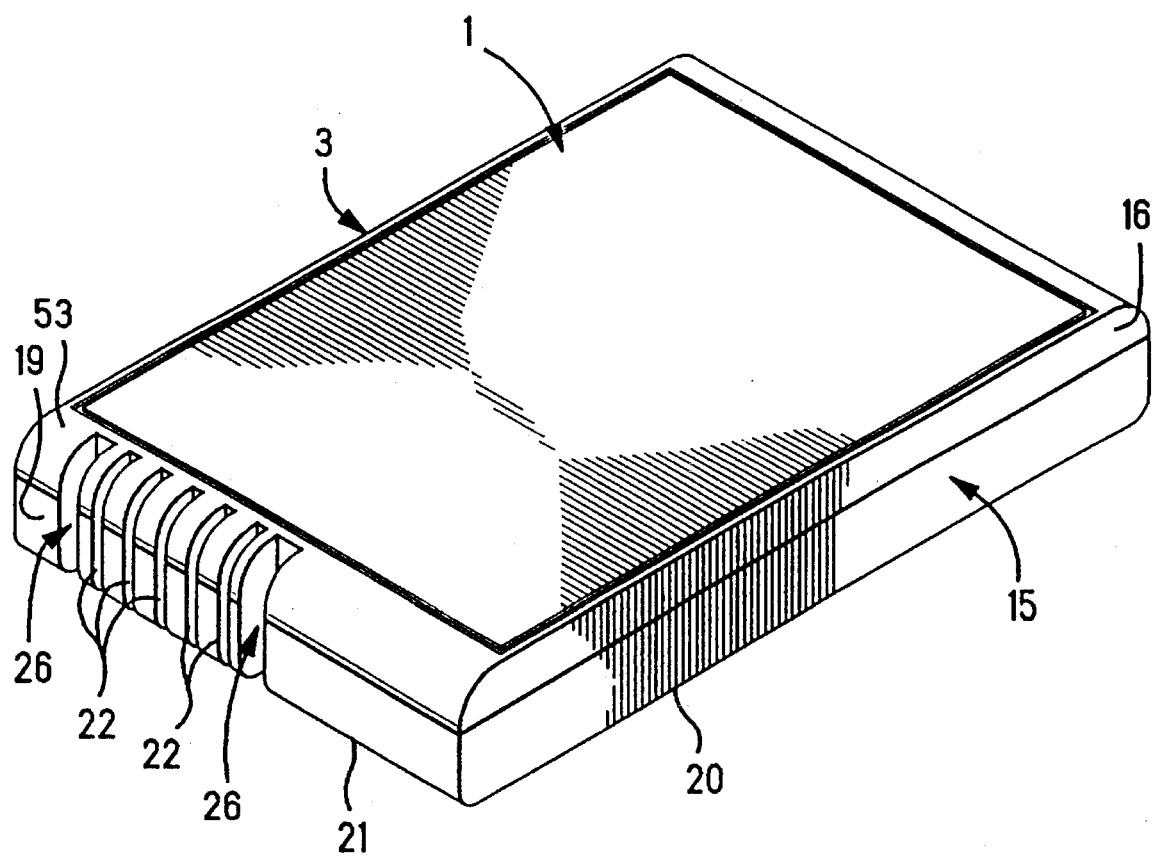
FIG. 10 is a perspective view of another variation of the battery shown in FIG. 5 having openings communicating with opposite sides of the battery.

An alternative connector 1, shown in each of FIGS. 5 and 10, locates the recess 22 and the ribs 23 and the recesses 26 offset to one side of a central axis of the connector 1. In this manner, the connector 1 shown in FIG. 5 locates the battery terminals 5, 6, 7, and 8 offset to one side of a central axis of the connector 1. Such a feature provides a keying combination that will resist a connection of the battery terminals 5, 6, 7, and 8 with terminals of another mating electrical connector, when the package 3 is incorrectly upside down, or when the mating electrical connector 24 is constructed for mating connection with a different, incompatible keying combination.

With reference to FIGS. 1, 8 and 9, the mating electrical connector 24 comprises, a unitary, one piece, insulating housing block 27 and conductive electrical contacts 28 two pairs of contacts 28 in FIG. 1, and an additional contact 28 in FIG. 9. The housing block 27 comprises, a base 29 for mounting on a circuit board, not shown, a side wall 30 extending from the base 29, and projecting end barriers 31 extending outward with respect to the side wall 30, and extending upward with respect to the base 29. The base 29 is mounted to a circuit board by fasteners, not shown, through fastener receiving openings, one shown in FIG. 1 at 32, in a part of the base 29 that extends past the side wall 30.

Each of the contacts 28 is formed from a metal strip, and includes, a base portion 34 adjacent a free end 35 that is forms an electrical terminal for plugged connection in a circuit board, not shown.

With reference to FIG. 1, each contact 28 forms a portion 36 extending from the base portion 34. The base portion 34 of each contact 28 impinges against the base 29 of the housing block 27. The portion 36 of each contact 28 extends from the base 29 of the housing block 27 toward an open top 37 of the housing block 27, and toward an open side 38 of the housing block 27. The contacts 28 are accessible through both the open top 37 and the open side 38 of the housing block 27, for mating engagement with respective terminals 5, 6, 7, 8. The housing block 27 is adapted with the open top 37, so as to mate and connect with a package 3 having an end 19 of varied height.

The end barriers 31 are at opposite ends of a row of the contacts 28, and comprise a coupling part. In FIG. 1 the barriers 31 are hook shaped to couple onto the coupling 25 that is recessed in the package 3. The size of the end barriers 31, and the spacing between the end barriers 31, are adapted for matching with the coupling 25 on the package 3. In each of FIGS. 1 and 8, the barriers 31 are at least slightly taller than the contacts 28, and serve to protect the contacts 28 from being struck accidentally. The barriers 31 have different widths for plugging into the recesses 26 of different widths, that are in the end 19 of the package 3. The barriers 31 would be unable to couple with a coupling 25 of different size and spacing comprising, for example, a different, incompatible package 3. For the battery connector 1 to uncouple from the mating connector 24, the package 3 allows withdrawal of the barriers 31 along the recesses 26. To matingly connect the battery connector 1 with the mating connector 24, an opposite procedure is followed, in that the package 3 is inserted along the barriers 31 to couple together the coupling 25 and the barriers 31.

The package 3 matingly connects with the mating connector 24, when the end 19 of the package and the side wall 30 of the mating connector 24 overlap, and when the bottom side 20 of the package 3 covers and seats against the base 29 of the mating connector 24.

Figure 6:
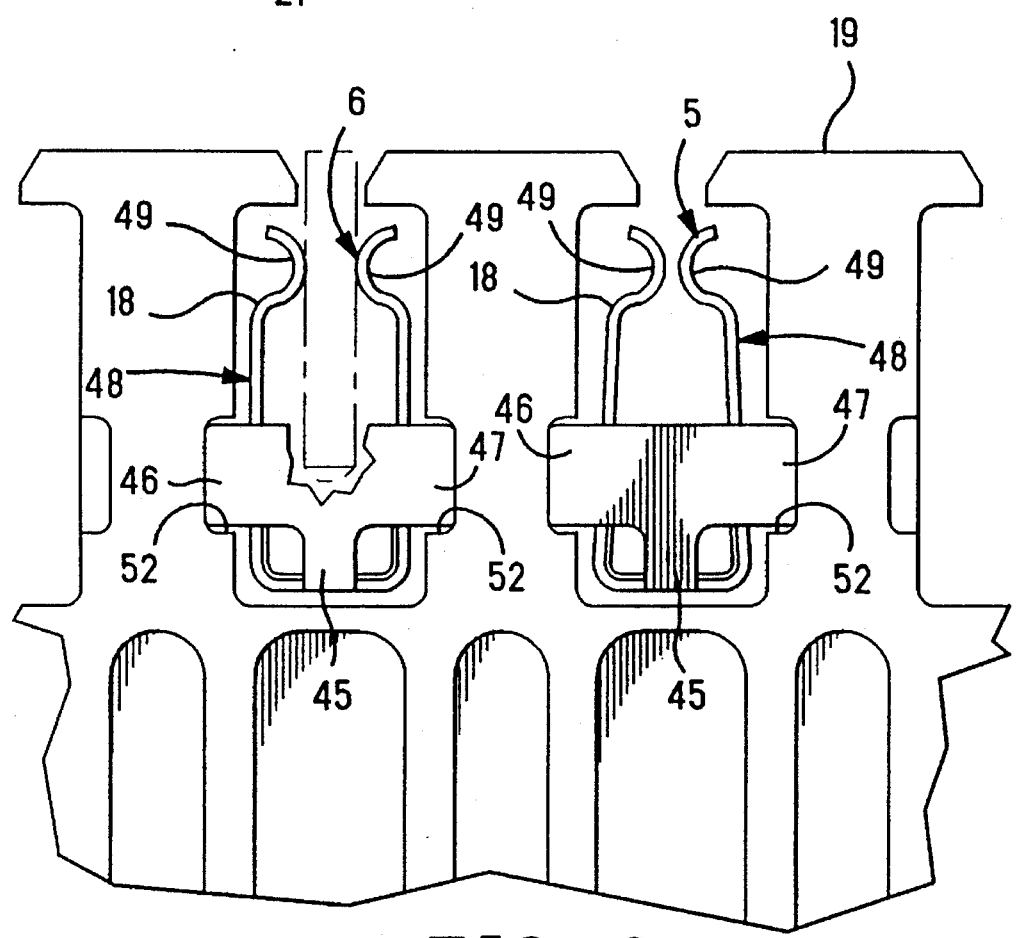
FIG. 6 is a fragmentary top plan view of a portion of the battery with a cover portion removed.

With reference to FIGS. 5 through 10, another embodiment of the connector 1 and of the mating connector 24 will be described. The mating connector 24, FIGS. 7 and 8, is similar to the connector 24, FIG. 1, in that the same reference numerals designate similar parts of construction. The mating connector 24 of FIGS. 6 and 7 is fabricated with the following differences in construction. The electrical contacts 28 mounted in the housing block 27 are metal blades having depending terminals 35 in the form of posts for mounting to a circuit board 41. The blades have top edges 42 facing an open top 37 of the housing block 27, and side edges 43 facing from an open side 38 of the housing block 27. The blades have chamfered edges 44 at the corners where the edges 42 intersect the edges 43. The barriers 31 are of different widths, and are adapted to be matingly received in recesses 26 of different widths in a modified package 3, as disclosed in FIGS. 5 through 8.

The recesses 22 in which are located the accessible portions 18 of the terminals 5, 6, 7 and 8, extend through the intersection 21 of the end 19 and the bottom side 20 of the package 3. The coupling 25 is absent from the package 3 of FIGS. 5 and 6.

FIGS. 6, 7, 8 and 9 disclose alternative constructions of the terminals 5, 6, 7, and 8. Each of the terminals 5, 6, 7, and 8 is of unitary construction, stamped and formed from a metal blank that has a central spine 45 and ribs 46, 47 extending in opposite directions from the spine 45. each of the terminals 5, 6, 7, and 8 comprises, a two-sided, spring resilient, receptacle 48. Each side 49 of the receptacle 48 extends from the spine 45. Each side 49 has a contact surface 51 that engages one side of a blade form of the electrical contact 28. Both sides 49 of the receptacle 48 are outwardly bowed to provide the receptacle 48 with outwardly bowed open sides 49. These open sides 49 are accessible to the end 19 of the package 3 and the bottom side 20 of the package 3, to receive and connect with a contact 28 on opposite sides of a blade of the mating connector 24, of FIGS. 6 and 7, that enters the recess 22 of the package from the end 19 of the package 3 of from the open bottom side 20 of the package 3. Mating connection is achieve when the end 19 is overlapped by the side wall 30, and the bottom side 20 covers the base 29 of the mating connector 24.

The ribs 46, 47 bridge across respective recesses 22 and are received in pockets 52 recessed in the base 15 at the intersection of the base 15 with the cover 16. When the cover 16 is applied to the base 15, the cover 16 will overlap the ribs 45, 46 and hold them in place within the pockets 52. The ribs 45, 46 in the pockets 52 provide cross braces that resist movement of the terminals 5, 6, 7 and 8, and maintain the receptacles 48 centered in the recesses 26.

A polarity feature, FIGS. 5 and 10, resides in the battery terminals 5, 6, 7 and 8 being offset to one side of a center of said end 19. This polarity feature will prevent undesired alignment or mating between the terminals 5, 6, 7 and 8 with the contacts 2 of the mating connector 24 when the package 3 is upside down. The barriers 31 being of different widths also prevent such undesired alignment or mating.

The package 3 can be purposely adapted for upside down mating. As shown in each of FIGS. 5 and 10, the end 19 of the package 3 has a height defined between exterior surfaces on the bottom side 20 and an opposite top side 53 of the cover 16. Each of the contact surfaces 51 has a height greater than one-half the height of said end 19. Thus, each of the contact surfaces 51 has an extended height that extends along the end 19 and provides multiple points of connection along the height for electrical connection with an electrical contact 28. This feature additionally permits mating or connection of the package 3 upside down with a mating connector 24. To permit upside down mating, the mating connector 24 can be modified by an interchange of the wide and narrow barriers 31. The barriers 31 have different widths for plugging into the recesses 26 of different widths, that are in the end 19 of the package 3. To provide polarity, and to permit connection of the package 3 in only an upside down position, the wide and narrow barriers 31 are required to exchange places on the mating connector 24.

In another form of the package 3, FIG. 10, the recesses 22 and the ribs 23 between adjacent recesses 22 extend through the cover 16 as well as the base 15. This package 3 will be able to connect bottom side 20 down or upside down, with the side 53 down, depending upon the positions of the wide and narrow barriers 31 on the mating connector 24.

We claim:

1. An electrical connector for a battery comprising:

multiple electrical battery terminals connected in electrical series with multiple cells of a battery, a package containing the terminals and the cells, contact surfaces of the terminals being accessible through recesses in an end of the package, each of the contact surfaces having a height extending along said end and providing multiple points of connection along the height for electrical connection with an electrical contact of another, mating electrical connector, each of the recesses having a height extending along said end and providing multiple locations along said height of the recess for receiving therein electrical contacts of another, mating electrical connector, and opposed blades on each of the contacts comprising an electrical receptacle for electrical connection with an electrical contact of another, mating electrical connector, the contact surfaces extending along respective blades, and cross braces on the contacts bridging across respective recesses.

2. An electrical connector for a battery comprising:

multiple electrical battery terminals connected in electrical series with multiple cells of a battery, a package containing the terminals and the cells, contact surfaces of the terminals being accessible through recesses in an end of the package, each of the contact surfaces having a height extending along said end and providing multiple points of connection along the height for electrical connection with an electrical contact of another, mating electrical connector, each of the recesses having a height extending along said end and providing multiple locations along said height of the recess for receiving therein electrical contacts of another, mating electrical connector, and barrier receiving recesses in the end communicating with opposite sides of the battery, and the recesses being of different widths for mating with respective barriers of different widths on a mating electrical connector.

3. An electrical connector for a battery comprising:

multiple electrical battery terminals connected in electrical series with multiple cells of a battery, a package containing the terminals and the cells, contact surfaces of the terminals being accessible through recesses in an end of the package, each of the contact surfaces having a height extending along said end and providing multiple points of connection along the height for electrical connection with an electrical contact of another, mating electrical connector, each of the recesses having a height extending along said end and providing multiple locations along said height of the recess for receiving therein electrical contacts of another, mating electrical connector, and the recesses extending through the end and communicated with both of the exterior surfaces on opposite sides of the package, and the contacts being disposed along the recesses, enabling upside down mounting of the package.

4. An electrical connector as recited in claim 3, wherein, recesses in the end communicate with opposite sides of the battery, and the recesses are of different widths for mating with respective barriers of different widths on a mating electrical connector.

5. An electrical connector as recited in claim 3, wherein, recesses in the end communicate with opposite sides of the package, and the recesses are of different widths for mating with respective barriers of different widths on a mating electrical connector.

6. An electrical connector on a battery for removably connecting the battery with equipment that relies on the battery for a supply of electrical voltage, the connector comprising:

multiple electrical battery terminals in an insulating package for containing multiple battery cells, and comprising a battery having battery cells in the package connected with the terminals, and contact surfaces on the terminals being accessible through recesses in the package, each of the contact surfaces having a height, said height providing multiple points of removable electrical connection along the height of the contact surface with an electrical contact of another, mating electrical connector mounted on equipment that relies on battery for a supply of electrical voltage, each of the recesses having a height extending along a corresponding contact surface and providing multiple locations along said height of the recess for receiving therein the electrical contact of another, mating electrical connector mounted on equipment that relies on the battery for a supply of electrical voltage, opposed blades on each of the contacts comprising an electrical receptacle for electrical connection with an electrical contact of another, mating electrical connector, and the contact surfaces extending along respective blades.

7. An electrical connector on a battery for removably connecting the battery with equipment that relies on the battery for a supply of electrical voltage, the connector comprising:

multiple electrical battery terminals in an insulating package for containing multiple battery cells, and comprising a battery having battery cells in the package connected with the terminals, and contact surfaces on the terminals being accessible through recesses in the package, each of the contact surfaces having a height, said height providing multiple points of removable electrical connection along the height of the contact surface with an electrical contact of another, mating electrical connector mounted on equipment that relies on the battery for a supply of electrical voltage, each of the recesses having a height extending along a corresponding contact surface and providing multiple locations along said height of the recess for receiving therein the electrical contact of another, mating electrical connector mounted on equipment that relies on the battery for a supply of electrical voltage, opposed blades on each of the contacts comprising an electrical receptacle for electrical connection with an electrical contact of another, mating electrical connector, the contact surfaces extending along respective blades, and cross braces on the contacts bridging across respective recesses.

8. An electrical connector on a battery for removably connecting the battery with equipment that relies on the battery for a supply of electrical voltage, the connector comprising:

multiple electrical battery terminals in an insulating package for containing multiple battery cells, and comprising a battery having battery cells in the package connected with the terminals, and contact surfaces on the terminals being accessible through recesses in the package, each of the contact surfaces having a height, said height providing multiple points of removable electrical connection along the height of the contact surface with an electrical contact of another, mating electrical connector mounted on equipment that relies on the battery for a supply of electrical voltage, each of the recesses having a height extending along a corresponding contact surface and providing multiple locations along said height of the recess for receiving therein the electrical contact of another, mating electrical connector mounted on equipment that relies on the battery for a supply of electrical voltage, opposed blades on each of the contacts comprise an electrical receptacle for electrical connection with an electrical contact of another, mating electrical connector, the contact surfaces extending along respective blades, a bight connecting opposed blades on each of the contacts, and pockets in the package receiving respective bights.

9. An electrical connector on a battery, comprising:

multiple battery terminals in an outer insulating package, battery cells in the outer insulating package, the battery cells being electrically connected to the battery terminals in an interior of the outer insulating package;

the battery terminals connecting the battery cells with, and disconnecting the battery cells from, a mating electrical connector on equipment that relies on a battery for a source of electrical voltage;

recesses in an end of the outer insulating package for connection with, and disconnection from, said mating electrical connector on equipment that relies on a battery for a source of electrical voltage, the recesses being aligned with the battery terminals;

the battery cells and the battery terminals being connected with, and disconnected from, said mating electrical connector upon said recesses being connected with, and disconnected from, said mating electrical connector;

said end of the outer insulating package having a height extending between exterior surfaces on opposite sides of the outer insulating package; and each of the terminals and each of the recesses having respective heights greater than one-half the height of said end of the outer insulating package to provide multiple points of removable connection of said each of the terminals with said mating electrical connector.

10. An electrical connector on a battery as recited in claim 9 wherein, said recesses extend through at least one of said exterior surfaces.

11. An electrical connector on a battery as recited in claim 9 wherein, said recesses extend through both of said exterior surfaces.

12. An electrical connector on a battery as recited in claim 9, and further comprising: barrier receiving recesses in said end of the outer insulating package for mating with barriers on said mating electrical connector.

13. An electrical connector on a battery as recited in claim 12 wherein, said barrier receiving recesses in said end of the outer insulating package communicate with at least one of said exterior surfaces.

14. An electrical connector on a battery as recited in claim 12 wherein, said barrier receiving recesses in said end of the outer insulating package communicate with said exterior surfaces.

* * * * *